March 25, 1952  E. E. LYNCH  2,590,780
COMPASS CONTROLLED DIRECTIONAL GYRO
Filed April 11, 1947
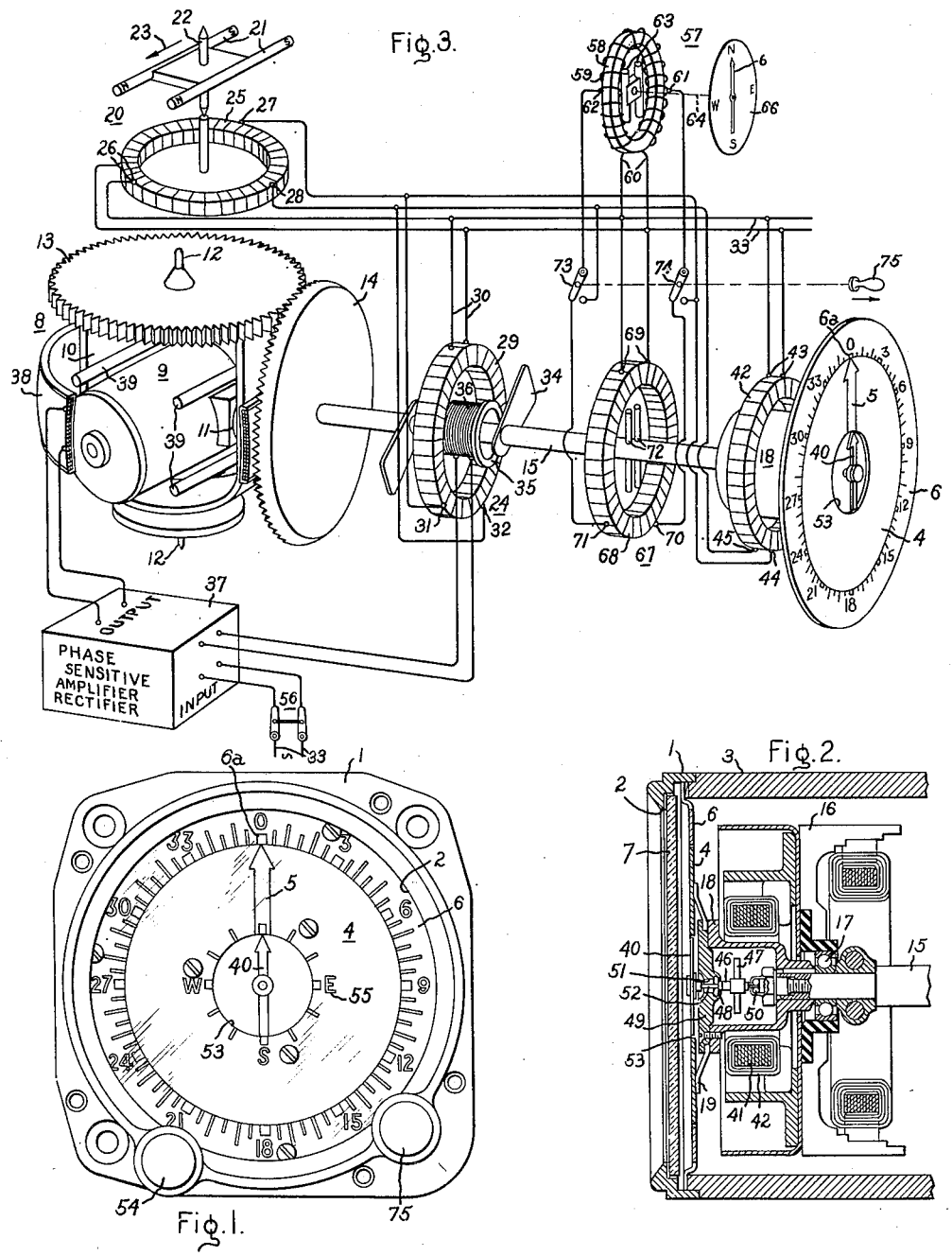
Inventor:
Edward E. Lynch,
by Claude A. Mott.
His Attorney.

Patented Mar. 25, 1952

2,590,780

UNITED STATES PATENT OFFICE 2,590,780

COMPASS CONTROLLED DIRECTIONAL GYRO

Edward E. Lynch, Wakefield, Mass., assignor to General Electric Company, a corporation of New York Application April 11, 1947, Serial No. 740,827

4 Claims. (Cl. 33—222)

The present invention relates to gyroscopic instruments and more particularly to an azimuth indicating instrument for moving vehicles known as a compass-controlled directional gyro.

In instruments of this type an azimuth indicating pointer or dial is actuated by a direct coupling to a directional gyro. A differential detector system is provided which continuously compares the position of the gyro with the magnetic meridian, as indicated by a compass, and when any departure from correspondence occurs a torque motor is energized in a direction to cause the gyro to precess back to the correspondence position. With this combined arrangement the gyro overcomes the short period instability of the compass and the compass overcomes the long period drift error of the gyro.

Because there is a possibility that the detector control system may fail, permitting the gyro to drift and thus give an erroneous azimuth indication, it is desirable to provide a correspondence indicator to indicate when the gyro and compass are in correspondence. A correspondence indicator is also useful in initially setting the gyro in correspondence with the compass.

Heretofore correspondence indicators have been used which merely indicate the direction the gyro is being precessed by the torque motor by measuring, for example, the direction and amount of torque motor torque. Indicators of this type are subject to the disadvantage that they do not permit a determination of the amount of any lack of correspondence between the compass and gyro. The reason for this is the fact that the detector system is designed because of other considerations so that full torque is applied to the gyro when lack of correspondence is more than a few degrees. Therefore, an observer sometimes cannot tell from the indicator whether the lack of correspondence is small as may be encountered during normal swinging of the compass or large due to some failure of the equipment. Furthermore, when a failure does occur an indicator of this type does not give any clue as to the nature of the failure.

An object of the present invention is to provide an improved correspondence indicator for a compass-controlled directional gyro.

Another object is to provide an indicator which indicates the relative positions of the gyro and compass and further provides an easily interpreted indication of the angular difference between the gyro and compass positions.

A further object is to provide a correspondence indicator that can be used as an emergency compass in case of failure of the directional gyro.

A further object is to provide a correspondence indicator which assists in locating the cause of any lack of correspondence between the gyro and compass.

A still further object is to provide a compass-controlled directional gyro which will operate a remote indicator to give selective indication of gyro and compass position.

Further objects and advantages of the invention will become apparent and the invention will be better understood from the following description referring to the accompanying drawing and the features of novelty which characterize the invention will be pointed out with particularity in the claims annexed to and forming a part of this specification.

In the drawing:

Fig. 1 is a front elevational view of a compass-controlled directional gyro instrument embodying the present invention.

Fig. 2 is a side sectional view of the front portion of the instrument shown in Fig. 1.

Fig. 3 is a perspective schematic view of the compass-controlled gyro system combined with a wiring diagram showing the electrical interconnections of the various parts.

Referring to the drawing, I have shown my invention as embodied in a compass-controlled directional gyro instrument of a type now widely used on aircraft for indicating azimuth headings. The instrument is shown as comprising a rectangular face-plate 1 which is adapted to be mounted on the instrument panel of an aircraft to permit a pilot or other observer to observe indication of the instrument through a circular opening 2 in the face-plate. The face-plate 1 supports a casing 3 which extends behind the instrument panel and houses the instrument.

Azimuth heading of the aircraft is indicated by a rotating dial 4 having painted or marked thereon a course indicating pointer 5. The pointer 5 is read against a stationary scale plate 6 having compass heading indicia 6a marked thereon. A transparent cover glass 7 is provided to protect the instrument by sealing the opening 2 in the face-plate.

The azimuth indicating dial 4 is mechanically connected to be rotated by a directional gyro which will now be described. The directional gyro, indicated generally at 8 (Fig. 3), is of known construction and comprises a gyro rotor mounted in a bearing frame 9 for rotation about a normally horizontal spin axis. A motor (not shown) is provided in the bearing frame for driving the gyro rotor at a suitable speed. The bearing frame is pivotally mounted on a main gimbal 10 for rotation about a horizontal minor gimbal axis perpendicular to the spin axis of the gyro rotor by means of trunnions, one of which is shown at 11. The main gimbal 10 is pivotally supported by the casing 3 for rotation about a vertical main gimbal axis by means of trunnions 12.

In order to transmit motion of the main gimbal 10 to the azimuth dial 4 there is provided a ring gear 13 which, in the illustrated arrangement, is mounted on the upper portion of the gimbal 10 so that it engages in meshing relation the upper edge of a vertical bevel gear 14. The bevel gear 14 is carried on the inner end of a forwardly extending horizontal shaft 15, the shaft 15 being supported by means of forward and rear ball bearings carried in a frame member 16. The forward bearing for the shaft 15 is shown at 17, a showing of the rear bearing having been omitted for the purpose of clarity. The forward end of the shaft 15 carries a hollow hub member 18 to which the dial 4 is attached by means of suitable supporting members 19. With this arrangement rotation of an aircraft on which the instrument is mounted about a vertical axis will cause a corresponding rotation of the pointer 5 and by selecting a 1 to 1 gear ratio of the gears 13 and 14 the rotation of the pointer will correspond to the rotation of the aircraft, as will be well understood by those skilled in the art.

While the directional gyro provides stable azimuth indication which is not affected by acceleration, it is subject to a long period drift due to factors such as rotation of the earth and gimbal bearing friction. In order to overcome this difficulty a magnetic compass, indicated generally at 20, is provided which gives an additional directional reference by indicating the direction of the magnetic meridian. By means of a synchronizing system which will be described, the positions of the compass and gyro are continuously compared and any lack of correspondence therebetween causes the gyroscope to be slowly precessed back to the correspondence position. With this combination the gyroscope overcomes the short period instability of the compass and the compass overcomes the long period inaccuracy of the gyroscope, so that an accurate stable azimuth indicating system is provided.

The magnetic compass 20 is usually located at a considerable distance from the gyroscope instrument at some location on the aircraft where the local magnetic interference is least. The compass 20 is shown schematically as comprising a pair of compass magnets 21 carried on a shaft 22 which is pivoted so as to permit free swinging movement of the compass magnet into alignment with the earth's magnetic field indicated by arrows 23.

The position of the compass magnets 21 is transmitted electrically to a detector 24 which compares the relative positions of the gyro and compass magnets and provides an electrical output signal, the polarity of which indicates the direction of any lack of correspondence, the output signal being zero when correspondence is attained.

In order to electrically transmit the position of the compass magnet 21 to the detector 24 there is provided a compass transmitter 25 of known construction which is referred to in the art as an induced second-harmonic type. The transmitter 25 comprises a ring core of highly saturable magnetic material which carries a uniformly distributed winding, the end connections of which are indicated at 26. The winding also has tapped polyphase connections 27 and 28.

The detector 24 has a stator 29 which is similar in construction to the compass transmitter 25 except that the stator core is not designed for saturation. The end connections of the winding are indicated at 30 and the tapped polyphase connections being indicated at 31 and 32. The compass transmitter and the detector are energized by connecting the winding leads 26 and 30 to a suitable source of alternating current supply indicated at 33 and the tapped polyphase connections 27 and 28 of the transmitter 25 are connected to the corresponding tapped connections 31 and 32 of the detector 24. The magnetic flux from the compass magnets 21 threads the core of transmitter 25 causing second harmonic currents to flow in the windings of the compass transmitter and the detector, which in turn cause an alternating magnetic flux to flow diametrically across the stator 29 of the detector. The orientation of this diametrically flowing magnetic flux remains in angular correspondence with the compass transmitter magnets 21. The magnetic flux from the stator 29 passes through a Z-shaped flux conductor member 34 which is mounted upon and rotates with the shaft 15. The flux conductor 34 conducts the magnetic flux through the center of a stationary tubular coil support 35 which carries a secondary winding 36. With this arrangement there is no voltage induced in the secondary winding 36 when the gyro and compass are in correspondence. However if they move out of correspondence, an alternating voltage is induced in the secondary winding 36 the polarity of which indicates the direction of the deviation from the correspondence position.

The output of the detector coil 36 is connected to the input of a phase-sensitive, amplifier-rectifier 37 of known construction which converts the detector signal to a reversible-polarity direct current. The output of the amplifier rectifier 37 is connected to a stationary coil 38 which is concentric with the main gimbal axis of the directional gyro 10 and which forms a part of a torque motor used to precess the directional gyro into correspondence with the magnetic compass. The unidirectional magnetic flux produced by the coil 38 reacts upon the flux produced by permanent magnets 39 carried on the gyro bearing frame. In this manner a torque is applied about the minor gimbal axis of the gyro causing it to precess about the major gimbal axis in a direction determined by the polarity of the direct current applied to the coil 38. Thus it will be apparent that by a proper phasing of the connections between the detector 24 and the gyro torque motor coil 38, the gyro can be made to precess in a direction to restore correspondence between the gyro and compass.

Because there is a possibility that the system for synchronizing the compass and the gyro may fail, and for other reasons which will become apparent as the description proceeds, it is desirable to provide a correspondence indicator for indicating the degree of correspondence between the compass and gyro. According to the present invention I have provided a novel form of correspondence indicator which greatly improves the reliability and performance of the compass-controlled directional gyro.

Essentially my improved correspondence indicator comprises a remote compass indicator for indicating on the face of the instrument the position of the compass magnets 21. The correspondence indicator has a pointer 40 mounted in such a manner that its axis of rotation is concentric with the axis of rotation of the gyro pointer 5, and because of this arrangement the angular relationship of the gyro and compass position is readily perceived for all possible positions of the compass and gyro.

Referring now to the details of the correspondence indicator, there is mounted on the frame member 16 a saturable magnetic ring core 41 which surrounds the hollow hub member 18. The core 41 carries a uniformly distributed winding 42 which is similar to the stator windings of the compass transmitter 25, the end connections 43 of the winding being connected to the common source of alternating current supply 33. The winding 42 also has similar polyphase tap connections 44 and 45 which are connected to corresponding connections 27 and 28 of the compass transmitter 25 as shown. This arrangement will cause a pulsating unidirectional magnetic flux to flow diametrically across the core 41, the orientation of this magnetic flux remaining in angular correspondence with the position of the compass magnets 21.

Mounted within the hollow hub member 18 adjacent the outer end of the gyro shaft 15 is a second horizontal shaft 46 carrying a pair of permanent magnets, one of which is shown at 47. The forward end of the shaft 46 is supported in a low-friction bearing 48 carried by a plate member 49 which is supported on and encloses the front opening of the hollow hub member 18. The rear end of the shaft 46 is supported on a low friction jewel bearing 50 carried on the forward end of the gyro shaft 15. The shaft 46 is free to rotate about an axis concentric with the axis of the shaft 15 and because the jewel bearing 50 is a low friction type, rotation of the shaft 15 by the directional gyro 8 does not apply any appreciable torque to the shaft 46. Thus the permanent magnets 47 are at all times free to swing into alignment with the magnetic flux field produced by the stator core 41 and therefore are positioned in correspondence with the compass magnets 21. The hub member 18 is preferably formed of a non-magnetic material to prevent any short circuiting of the flux produced by the core 41.

The plate member 49 has a central opening 51 through which projects a shaft extension 52 of the shaft 46. The shaft extension 52 carries the correspondence indicator 40 which rotates with the permanent magnets 47 and therefore provides on the face of the instrument an indication of the position of the compass magnets 21. The azimuth dial 4 has a central opening 53 which permits an arrangement wherein the pointers 5 and 40 rotate in a common plane. This arrangement has the advantage that parallax errors are avoided so that the angular relationship of the pointers 5 and 40 can be accurately determined for various oblique positions in front of the instrument.

In operation it is customary to initially set the gyro in correspondence with the compass to avoid the necessity for waiting until the gyro torque motor precesses the gyro to synchronism, which action is necessarily slow and may take a considerable period of time in cases where the gyro and compass are initially a considerable amount out of correspondence. The initial setting of the gyro is accomplished by means of a caging and reset knob 54 which controls conventional mechanism (not shown) for caging the gyro and rotating it about the vertical main gimbal axis. The operator actuates the knob 54 until the gyro pointer 5 is in alignment with the correspondence indicator 40 whereby the gyro and compass are initially synchronized. Thereafter the detector 24 controls the gyro torque motor to maintain correspondence between the gyro and the compass as explained above. At any time during operation of the instrument, the degree of correspondence between the gyro and compass can be quickly and conveniently checked by simply noting whether or not the pointers 5 and 40 are in alignment, this relationship holding true for all azimuth headings of the pointer 5 throughout its 360 degrees of movement.

During normal operation, the compass magnets 21 normally oscillate back and forth about a mean position. This swinging of the compass magnet causes, of course, a corresponding swinging of the correspondence indicator pointer 40. With my improved arrangement wherein the pointers 5 and 40 are coaxially mounted, it becomes very easy for the operator to accurately compare the average position of the compass with that of the gyro by noting whether or not the swings of the pointer 40 are symmetrical relative to the position of the gyro pointer 5.

Because of the fact that my improved correspondence indicator is in effect a remote indicator of the position of the compass 20, it has the advantage that in case the gyro fails it may be utilized as an emergency compass. To permit such emergency use, stationary compass heading indicia 55 may be provided. In the illustrated arrangement the compass heading indicia are placed on the cover glass 7 by painting or any other suitable form of marking. As an alternative the indicia 55 may be inscribed on the azimuth dial 4 but if this arrangement is used it is necessary to first cage the directional gyro and then rotate the dial by means of the knob 54 to some reference position, such as due north, for which position the indicia are calibrated for true compass indication.

My improved correspondence indicator not only provides means for readily detecting a lack of correspondence between the compass and gyro but also enables the pilot or other observer to predict what part of the system is defective in case a lack of correspondence is noted. This is made possible because of the fact that the correspondence indicator 40 indicates the normal swing or oscillation of the compass magnets 21. Thus, if during flight the pilot should note a lack of correspondence between the pointers 5 and 40, and the pointer 40 does not oscillate, the chances are the difficulty lies in the compass. He can then disconnect the compass control and fly his aircraft by gyro indication alone. On the other hand, if the pointers are out of correspondence and the pointer 40 is oscillating normally, the chances are the difficulty lies in the gyro and the pilot being thus informed can fly by the compass indication.

During flights in the vicinity of the north and south magnetic poles, the magnetic compass becomes erratic and is unreliable for navigation purposes. Under such conditions the compass control should be disconnected from the gyro so as to prevent erroneous precession thereof. One convenient way to disconnect the compass control under such conditions is to provide a switch such as switch 56 in the power supply circuit of the amplifier 37. When the switch 56 is open the gyro torque motor is disabled so that the gyro becomes free. When used as a free gyro the instrument must be periodically reset to correct for long period gyro drift.

While I have shown the gyro and compass indicators 5 and 40 in the form of pointers, it will be obvious that dials may be substituted with the compass markings on the dials. When a rotating dial with compass markings thereon is used for gyro heading indication, it is customary to rotate the dial in a direction opposite to that in which a pointer type is rotated. This reversal of rotation may be conveniently accomplished by shifting the gear 13 to the lower part of the gimbal 10 so that it meshes with the lower edge of gear 14.

Although I have shown a compass of the "slave" magnet type, other types may be used. For example, a direct pickup type, such as shown in Patent 2,414,128 Sinks.

In accordance with another aspect of the present invention an arrangement is provided whereby one or more remote compass indicators may be operated by a gyro stabilized transmitter or, alternatively, may be operated direct from the magnetic compass transmitter 25.

Remote compass indication is provided by means of a remote compass indicator indicated generally at 57. The indicator 57 comprises a ring core stator 58 of magnetic material which carries a distributed winding 59, this construction being identical to stators of the compass transmitter, and the correspondence indicator. End connections 60 of the winding 59 are connected to the common source of alternating current supply 33. The winding 59 also has polyphase tap connections 61 and 62. Mounted for rotation within the core 58 about an axis concentric with the axis of the core are a pair of permanent magnets 63 carried by a shaft 64. Also mounted on the shaft 64 is a pointer 65 which indicates compass headings on the stationary compass card 66.

Normally the remote indicator 57 is operated by means of a gyro stabilized transmitter indicated generally at 67. The transmitter 67 comprises a fixed annular stator 68 surrounding the gyro shaft 15 which is similar in construction to the stator of the remote indicator 57. The stator winding has end connections 69 which are connected to the alternating current supply leads 33 and polyphase tapped connections 70 and 71 corresponding to the connections 61 and 62 of the indicator 57 and connections 27 and 28 of the compass transmitter 25. A pair of permanent magnets 72 mounted to rotate with shaft 15 are located inside of the stator 68.

A pair of single-pole, double-throw, ganged switches 73 and 74 normally connect the connections 70 and 71 of the transmitter 67 to the connections 61 and 62 of the indicator 57. However, when the switches 73 and 74 are moved to the vertical position, they disconnect the indicator 57 from the transmitter 67 and connect the connections 27 and 28 of the compass transmitter 25 to the connections 61 and 62 of the indicator. The transfer switches 73 and 74 may conveniently be controlled by means of an operating knob 75 located on the front face of the instrument.

It will be clear from the foregoing that whenever the transfer switches 73 and 74 are set to connect the remote indicator 57 to the transmitter 67, the remote indicator will provide compass heading indication which is a duplicate of that provided by the gyro pointer 5. If desired, a number of other remote indicators similar to the indicator 57 may be connected in parallel therewith so as to provide stable azimuth indication at several locations on the aircraft. In the event that the correspondence indicator 40 should show that for some reason the gyro is functioning improperly, the transfer switches 73 and 74 may be shifted to connect the remote indicator 57 directly to the compass transmitter 25 whereupon remote compass indication is provided. Thus it will be seen that by the use of compass and gyro actuated transmitters which may be selectively connected to one or more remote indicators I have provided a system which is very flexible, and which provides compass heading information under emergency as well as normal conditions of operation of the compass controlled directional gyro.

While I have shown and described particular embodiments of my invention, it will occur to those skilled in the art that various changes and modifications may be made without departure from my invention, and I therefore aim in the appended claims to cover all such changes and modifications as fall within the true spirit and scope of my invention.

What I claim as new and desire to secure by Letters Patent of the United States is:

1. In combination, a directional gyro, a magnetic compass remote from said gyro and comprising a rotatable compass magnet, electrical synchronizing means responsive to the relative azimuth positions of said gyro and said compass magnet for precessing said gyro into correspondence with said compass, a first horizontal shaft having one end coupled to said gyro, a planar vertically arranged gyro indicator connected to said first shaft to indicate azimuth heading, a second shaft mounted for rotation on the other end of said first shaft, the axes of said shafts being concentric, an electrical position transmitting system connected to rotate said second shaft in angular correspondence with said compass magnet, and a planar correspondence indicator mounted on said second shaft to rotate therewith, said gyro and correspondence indicators being adjacent and coplanar to permit angular comparison of their indications.

2. In combination a directional gyro, a magnetic compass comprising a rotatable compass magnet, electrical differential detector means responsive to the relative azimuth positions of said gyro and said compass magnet for precessing said gyro into correspondence with said compass, a first horizontal shaft having one end coupled to said gyro, an annular vertically arranged dial connected to said first shaft to indicate azimuth heading, a second shaft mounted for rotation on the other end of said first shaft, the axes of said shafts being concentric, an electrical position transmitting system connected to rotate said second shaft in angular correspondence with said compass magnet, and a correspondence indicator mounted on said second shaft to rotate therewith, said correspondence indicator being arranged in the plane of said dial whereby the relative angular positions of said dial and indicator may be observed from various positions without parallax error.

3. In combination, a compass comprising a rotatable compass magnet, a directional gyro, a differential detector system controlled by said compass arranged to continuously precess the gyro into correspondence with the position of the compass magnet, a gyro-positioned magnet connected to said directional gyro, a first transmitter for producing electrical signals indicative of the position of said compass magnet, a second transmitter for producing electrical signals indicative of the position of said gyro-positioned magnet, a remote indicator comprising a rotatable magnet responsive to electrical position signals of the type produced by said first and by said second transmitters, a switch normally connecting said remote indicator to said second transmitter to provide remote indication of the compass-controlled gyro position for stable azimuth indication, said switch being operable to transfer connections of said remote indicator to said first transmitter to provide remote indication of said compass in the event of failure of said detector system to maintain correspondence between the compass and gyro, and a correspondence indicator for indicating the degree of correspondence between said gyro and compass.

4. A direction indicating system comprising a directional gyroscope; a first rotatable shaft coupled with said gyroscope for angular orientation in accordance with the azimuth headings of said gyroscope; an azimuth indicating dial structure coupled for rotation with said shaft and provided with a central hollow hub portion of non-magnetic material; a magnetic compass system remote from said gyroscope and having a rotatable element positioned in accordance with the direction of the earth's magnetic field; an electrical compass transmitter actuated by said magnetic compass system, said transmitter including a core of magnetic material carrying a winding tapped at a plurality of points; a second shaft mounted for rotation within said hollow hub portion of said dial structure, the axes of said shafts being substantially in alignment; a compass indicator rotatable with said second shaft; and an electrical compass receiver, said receiver including a permanent magnet rotor structure mounted on said second shaft within said hollow hub portion and a stator structure mounted outside of said hub portion, said stator structure including a core of magnetic material carrying a winding tapped at a plurality of points electrically interconnected with said compass transmitter winding.

EDWARD E. LYNCH.

REFERENCES CITED

The following references are of record in the file of this patent:

UNITED STATES PATENTS

| Number | Name | Date |
| --- | --- | --- |
| 1,617,310 | Sperry | Feb. 8, 1927 |
| 1,715,270 | Bassett | May 28, 1929 |
| 2,247,288 | Delsuc | June 24, 1941 |
| 2,307,788 | Nisbet et al. | Jan. 12, 1943 |
| 2,363,500 | Carter et al. | Nov. 28, 1944 |
| 2,414,128 | Sinks | Jan. 14, 1947 |

FOREIGN PATENTS

| Number | Country | Date |
| --- | --- | --- |
| 818,850 | France | June 8, 1937 |